US007650474B2

(12) United States Patent
Ellis et al.

(10) Patent No.: US 7,650,474 B2
(45) Date of Patent: Jan. 19, 2010

(54) METHOD AND SYSTEM FOR INTERLEAVING FIRST AND SECOND HALVES OF A DATA SEGMENT OF UNKNOWN LENGTH

(75) Inventors: Jackson Lloyd Ellis, Fort Collins, CO (US); Ori Ron Liav, Fort Collins, CO (US)

(73) Assignee: LSI Corporation, Milpitas, CA (US)

( * ) Notice: Subject to any disclaimer, the term of this patent is extended or adjusted under 35 U.S.C. 154(b) by 475 days.

(21) Appl. No.: 11/642,322

(22) Filed: Dec. 19, 2006

(65) Prior Publication Data

US 2007/0162714 A1 Jul. 12, 2007

Related U.S. Application Data

(60) Provisional application No. 60/757,832, filed on Jan. 9, 2006.

(51) Int. Cl.
*G06F 12/00* (2006.01)
(52) U.S. Cl. .................. 711/157; 711/127; 711/159
(58) Field of Classification Search .......... 711/157, 711/127, 159
See application file for complete search history.

(56) References Cited

U.S. PATENT DOCUMENTS 5,438,369 A * 8/1995 Citta et al. ............. 348/470
6,104,560 A * 8/2000 Tsunoda ................. 360/51
6,925,553 B2 * 8/2005 Roussel et al. .......... 712/245
2002/0112205 A1 * 8/2002 Gross et al. ............ 714/701
2003/0046501 A1 * 3/2003 Schulz et al. ........... 711/157

* cited by examiner

*Primary Examiner*—Christian P Chace
*Assistant Examiner*—Hashem Farrokh
(74) *Attorney, Agent, or Firm*—Yee & Associates, P.C.

(57) ABSTRACT

Method and system for dividing a data segment of unknown length into first and second halves, for example, for interleaving the first and second halves. Units of the data segment are written into first and second register files. With respect to the first register file, responsive to determining that the last unit of the data segment has been written into the first register file, units of the data segment in the first register file that are not units of the first half of the data segment are removed, wherein the first register file stores the first half of the data segment. With respect to the second register file, responsive to writing each unit of the data segment into the second register file, data currently stored in the second register file is adjusted to comprise a last half of the data so far written into the second register file, wherein, when the last unit of the data segment has been written into the second register file, and the data currently stored in the second register file has been adjusted, the data currently stored in the second register file comprises the second half of the data segment.

20 Claims, 7 Drawing Sheets

METHOD AND SYSTEM FOR INTERLEAVING FIRST AND SECOND HALVES OF A DATA SEGMENT OF UNKNOWN LENGTH

This application claims priority to provisional patent application Ser. No. 60/757,832, filed on Jan. 9, 2006, entitled "Method to Interleave First and Second Halfs of a Data Segment," which application is hereby incorporated herein by reference.

BACKGROUND OF THE INVENTION

1. Technical Field

The present invention is directed generally to the data processing field, and, more particularly, toward a method and system for interleaving first and second halves of a data segment of unknown length.

2. Description of the Related Art

A need exists in the data processing field to split a segment of data in half and then interleave the two halves together. For example, in a disk drive, read/write channels have the need to handle even and odd bits in parallel and use independent circuits in order to meet timing and power goals. To allow for this parallel even and odd data operation, even and odd data interleaves in the data stream are often required in order to have independent and often proprietary codings applied. These codings are better applied at a slower clock rate on a data path pipeline that is multiple bits wide, for example, 32 bits wide, and a mechanism is needed to separate the even and odd interleaves in such a data path for the purpose of applying such a coding.

Consider a segment of data that consists of N bits that are divided into N/S symbols, wherein S is symbol size in number of bits and N/S is an integer that can be bounded by a maximum constant value. The segment size N is based on the particular application, and ideally S has a relationship with the data path that interfaces to the circuit. For example, if a data path is 10 bits wide, it is convenient to choose a symbol size S that is either equal to 10 or is an integer multiple of 10. Consider also the interleave granularity K, which determines how many continuous bits are taken at a time from each half in order to perform the interleave. K can be any integer factor of S except S itself. If S is 10 bits, for example, K can be 1, 2 or 5.

As an example, consider a data segment having a length N=20 bits and a symbol size S=10 bits. The data segment thus has N/S=2 symbols. If the 20 bits of the data segment are designated a, b, c, d, e, f, g, h, i, j, k, l, m, n, o, p, q, r, s, t; splitting the data segment into two halves provides the following two data segment halves:

First half: a, b, C, d, e, f, g, h, i, j
Second half: k, l, m, n, o, p, q, r, s, t.

If the two halves are interleaved using K=5, the data bits will be arranged as follows:

a, b, c, d, e, k, l, m, n, o, f, g, h, i, j, p, q, r, s, t.

If the two halves are interleaved using K=2, the data bits will be arranged as follows:

a, b, k, l, c, d, m, n, e, f, o, p, g, h, q, r, i, j, s, t.

If the two halves are interleaved using K=1, the data bits will be arranged as follows:

a, k, b, l, c, m, d, n, e, o, f, p, g, q, h, r, i, s, j, t.

Consider an application in which the data bits must be interleaved within a data path pipeline that continuously takes S bits in and S bits out, and in which multiple input data segments are received concatenated together and multiple output interleaved data segments are transmitted concatenated together with no gaps in the pipeline. Also consider that N can be a variable in units of S for each of the data segments that are received, and that the actual value of N is not known until an indication occurs indicating that a given input symbol is the last symbol of the input data segment. N can, however, be bounded by a maximum value to assist in sizing structures used in the interleaving procedure. In such an application, a mechanism is needed to interleave the first and second halves of a data segment based on the above constraints.

SUMMARY OF THE INVENTION

Exemplary embodiments provide a method and system for dividing a data segment of unknown length into first and second halves, for example, for interleaving the first and second halves. A method for dividing a data segment into first and second halves of the data segment, wherein the data segment comprises an unknown plurality of data units, includes sequentially writing units of the data segment into first and second register files. With respect to the first register file, responsive to determining that the last unit of the data segment has been written into the first register file, units of the data segment in the first register file that are not units of the first half of the data segment are removed, wherein the first register file stores the first half of the data segment. With respect to the second register file, responsive to writing each unit of the data segment into the second register file, data currently stored in the second register file is adjusted to comprise a last half of the data so far written into the second register file, wherein when the last unit of the data segment has been written into the second register file, and the data currently stored in the second register file has been adjusted, the data currently stored in the second register file comprises the second half of the data segment.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION

The description of the preferred embodiment of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention and the practical application in order to enable others of ordinary skill in the art to understand the invention for various embodiments with various modifications as are suited to the particular use contemplated.

Figure 1:
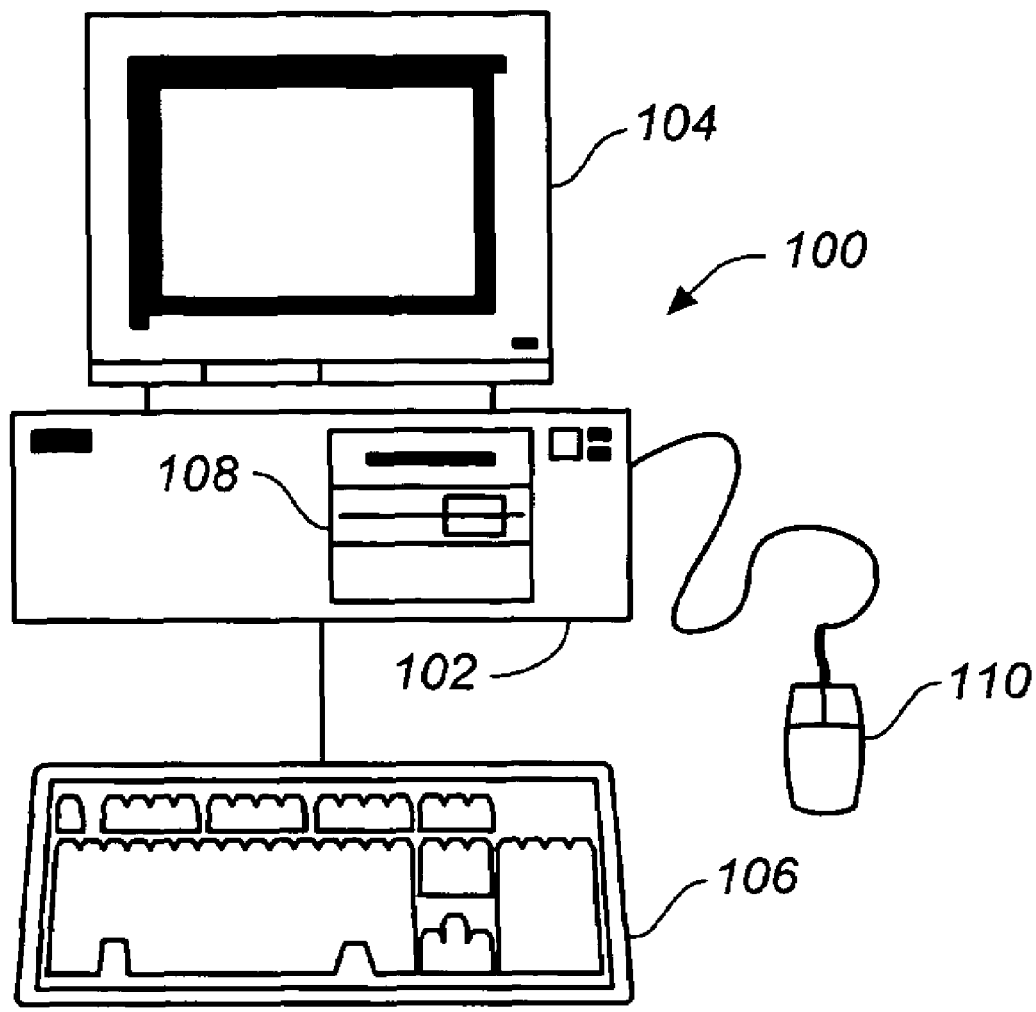
FIG. 1 is a pictorial representation of a data processing system in which the present invention may be implemented.

With reference now to the figures and in particular with reference to FIG. 1, a pictorial representation of a data processing system is shown in which illustrative embodiments may be implemented. Computer 100 includes system unit 102, video display terminal 104, keyboard 106, storage devices 108, which may include floppy drives and other types of permanent and removable storage media, and mouse 110. Additional input devices may be included with personal computer 100. Examples of additional input devices include a joystick, a touchpad, a touch screen, a trackball, a microphone, and the like.

Computer 100 may be any suitable computer, such as an IBM® eServer™ computer or IntelliStation® computer, which are products of International Business Machines Corporation, located in Armonk, N.Y. Although the depicted representation shows a personal computer, other embodiments may be implemented in other types of data processing systems. For example, other embodiments may be implemented in a network computer. Computer 100 also preferably includes a graphical user interface (GUI) that may be implemented by means of systems software residing in computer readable media in operation within computer 100.

Figure 2:
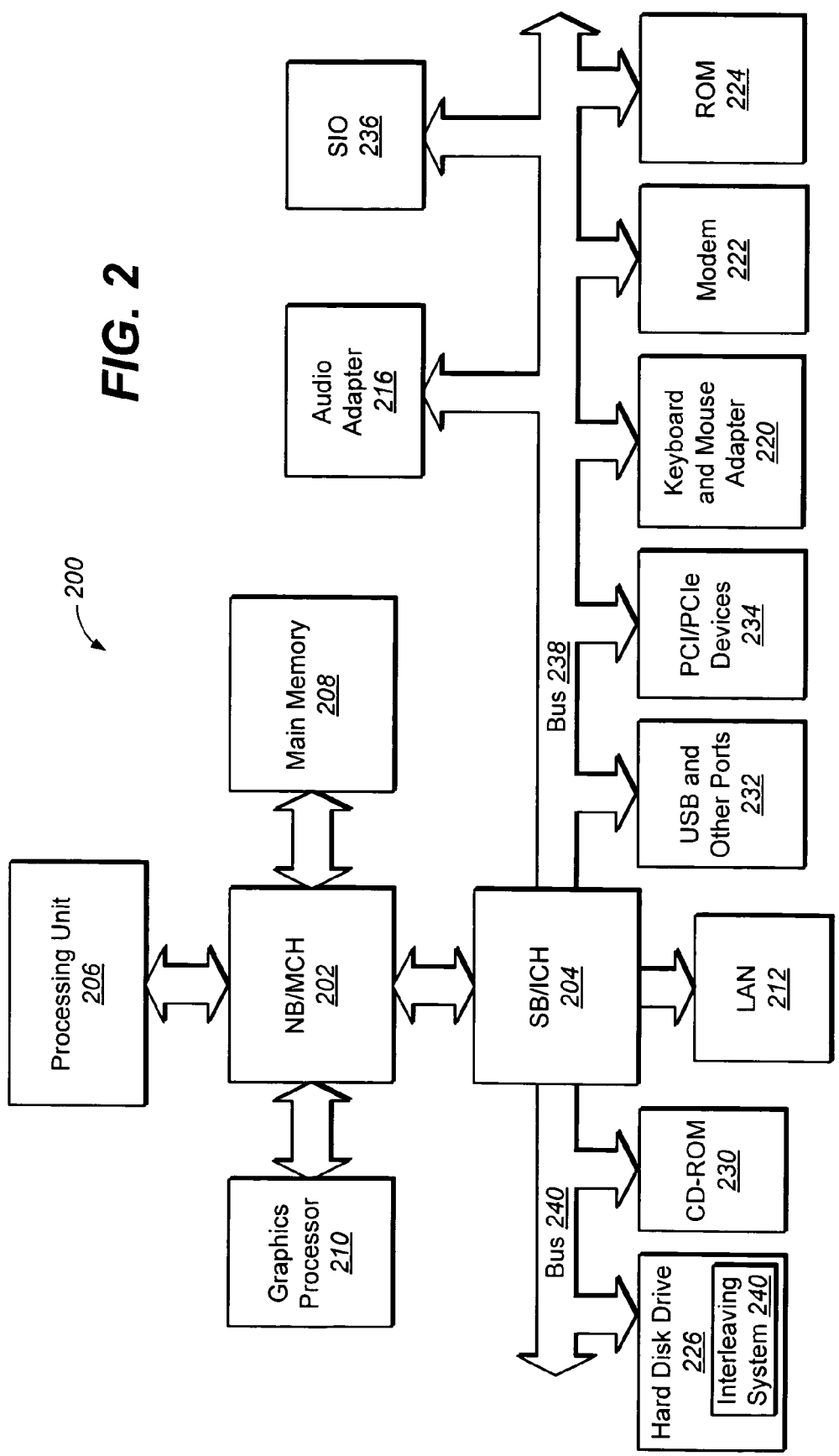
FIG. 2 is a block diagram of a data processing system in which the present invention may be implemented.

Next, FIG. 2 depicts a block diagram of a data processing system in which illustrative embodiments may be implemented. Data processing system 200 is an example of a computer, such as computer 100 in FIG. 1, in which code or instructions implementing the processes of the illustrative embodiments may be located.

In the depicted example, data processing system 200 employs a hub architecture including a north bridge and memory controller hub (MCH) 202 and a south bridge and input/output (I/O) controller hub (ICH) 204. Processing unit 206, main memory 208, and graphics processor 210 are coupled to north bridge and memory controller hub 202. Processing unit 206 may contain one or more processors and even may be implemented using one or more heterogeneous processor systems. Graphics processor 210 may be coupled to the MCH through an accelerated graphics port (AGP), for example.

In the depicted example, local area network (LAN) adapter 212 is coupled to south bridge and I/O controller hub 204, audio adapter 216, keyboard and mouse adapter 220, modem 222, read only memory (ROM) 224, and universal serial bus (USB) and other communications ports 232. PCI/PCIe devices 234 are coupled to south bridge and I/O controller hub 204 through bus 238. Hard disk drive (HDD) 226 and CD-ROM drive 230 are coupled to south bridge and I/O controller hub 204 through bus 240. As illustrated in FIG. 2, hard disk drive 226 includes an interleaving system 240 for interleaving first and second halves of a data segment as will be described in detail hereinafter in connection with the exemplary embodiment illustrated in FIGS. 3A and 3B.

PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM drive 230 may use, for example, an integrated drive electronics (IDE) or serial advanced technology attachment (SATA) interface. A super I/O (SIO) device 236 may be coupled to south bridge and I/O controller hub 204.

An operating system runs on processing unit 206. This operating system coordinates and controls various components within data processing system 200 in FIG. 2. The operating system may be a commercially available operating system, such as Microsoft® Windows XP®. Microsoft® and Windows XP® are trademarks of Microsoft Corporation in the United States, other countries, or both. An object-oriented programming system, such as the Java™ programming system, may run in conjunction with the operating system and provides calls to the operating system from Java™ programs or applications executing on data processing system 200. Java™ and all Java-based trademarks are trademarks of Sun Microsystems, Inc. in the United States, other countries, or both.

Instructions for the operating system, the object-oriented programming system, and applications or programs are located on storage devices, such as hard disk drive 226. These instructions and may be loaded into main memory 208 for execution by processing unit 206. The processes of the illustrative embodiments may be performed by processing unit 206 using computer implemented instructions, which may be located in a memory. An example of a memory is main memory 208, read only memory 224, or in one or more peripheral devices.

The hardware shown in FIG. 1 and FIG. 2 may vary depending on the implementation of the illustrated embodiments. Other internal hardware or peripheral devices, such as flash memory, equivalent non-volatile memory, or optical disk drives and the like, may be used in addition to or in place of the hardware depicted in FIG. 1 and FIG. 2. Additionally, the processes of the illustrative embodiments may be applied to a multiprocessor data processing system.

The systems and components shown in FIG. 2 can be varied from the illustrative examples shown. In some illustrative examples, data processing system 200 may be a personal digital assistant (PDA). A personal digital assistant generally is configured with flash memory to provide a non-volatile memory for storing operating system files and/or user-generated data. Additionally, data processing system 200 can be a table computer, a laptop computer, or a telephone device.

Other components shown in FIG. 2 can be varied from the illustrative examples shown. For example, a bus system may be comprised of one or more buses, such as a system bus, an I/O bus, and a PCI bus. Of course the bus system may be implemented using any suitable type of communications fabric or architecture that provides for a transfer of data between different components or devices attached to the fabric or architecture. Additionally, a communications unit may include one or more devices used to transmit and receive data, such as a modem or a network adapter. Further, a memory may be, for example, main memory 208 or a cache such as found in north bridge and memory controller hub 202. Also, a processing unit may include one or more processors or CPUs.

The depicted examples in FIG. 1 and FIG. 2 are not meant to imply architectural limitations. In addition, the illustrative embodiments provide for a computer implemented method, apparatus, and computer usable program code for compiling source code and for executing code. The methods described with respect to the depicted embodiments may be performed in a data processing system, such as data processing system 100 shown in FIG. 1 or data processing system 200 shown in FIG. 2.

Exemplary embodiments of the present invention provide a method and system, in a data processing system, for dividing a data segment into first and second halves, wherein the length of the data segment is not known until a last unit of the data segment is received. Exemplary embodiments also provide a method and system, in a data processing system, for interleaving first and second halves of a data segment, wherein the length of the data segment is not known until a last unit of the data segment is received.

Figure 3A:
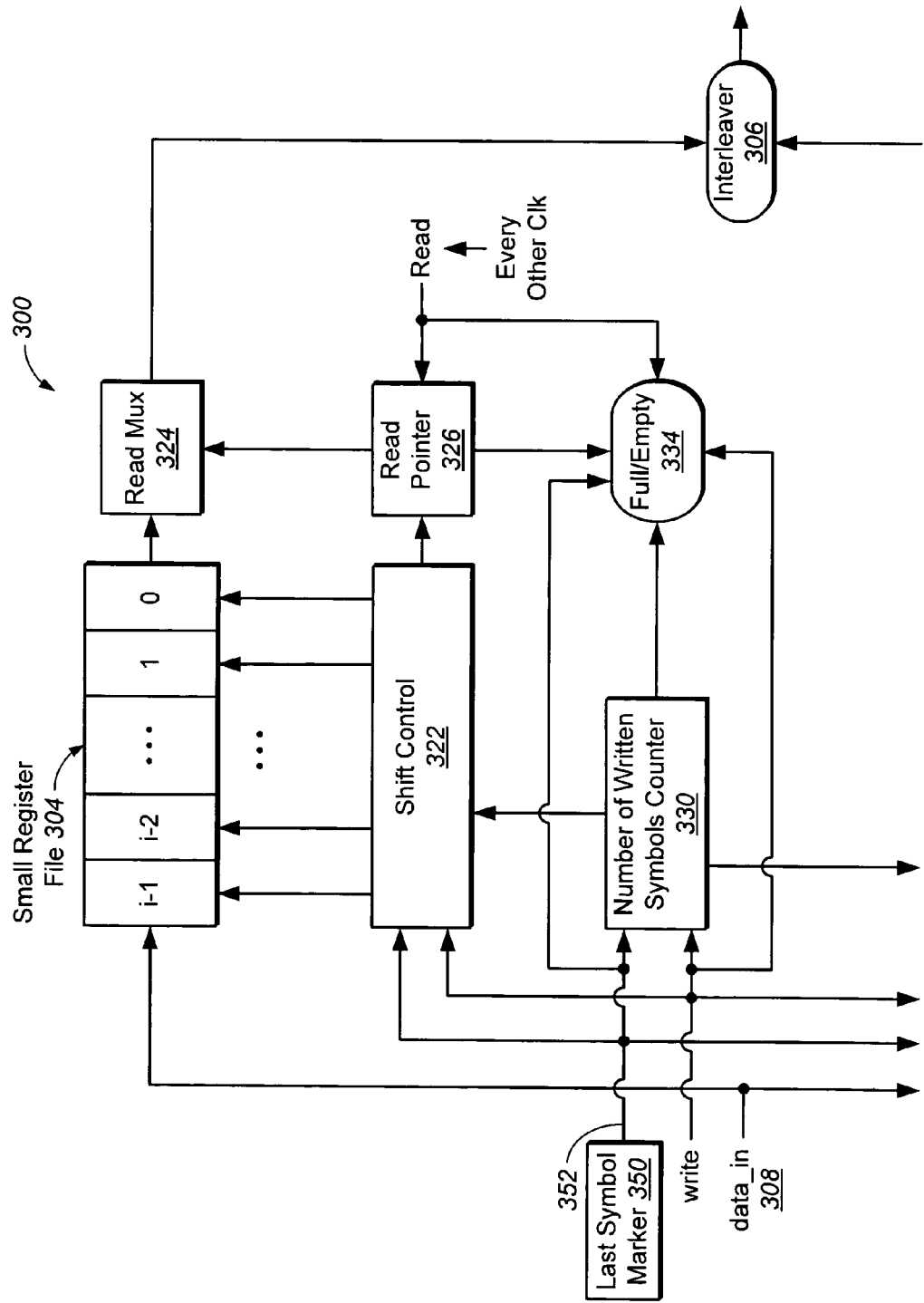
FIGS. 3A and 3B together show a block diagram that illustrates a system for interleaving first and second halves of a data segment of unknown length according to an exemplary embodiment.
Figures 3, 3B:
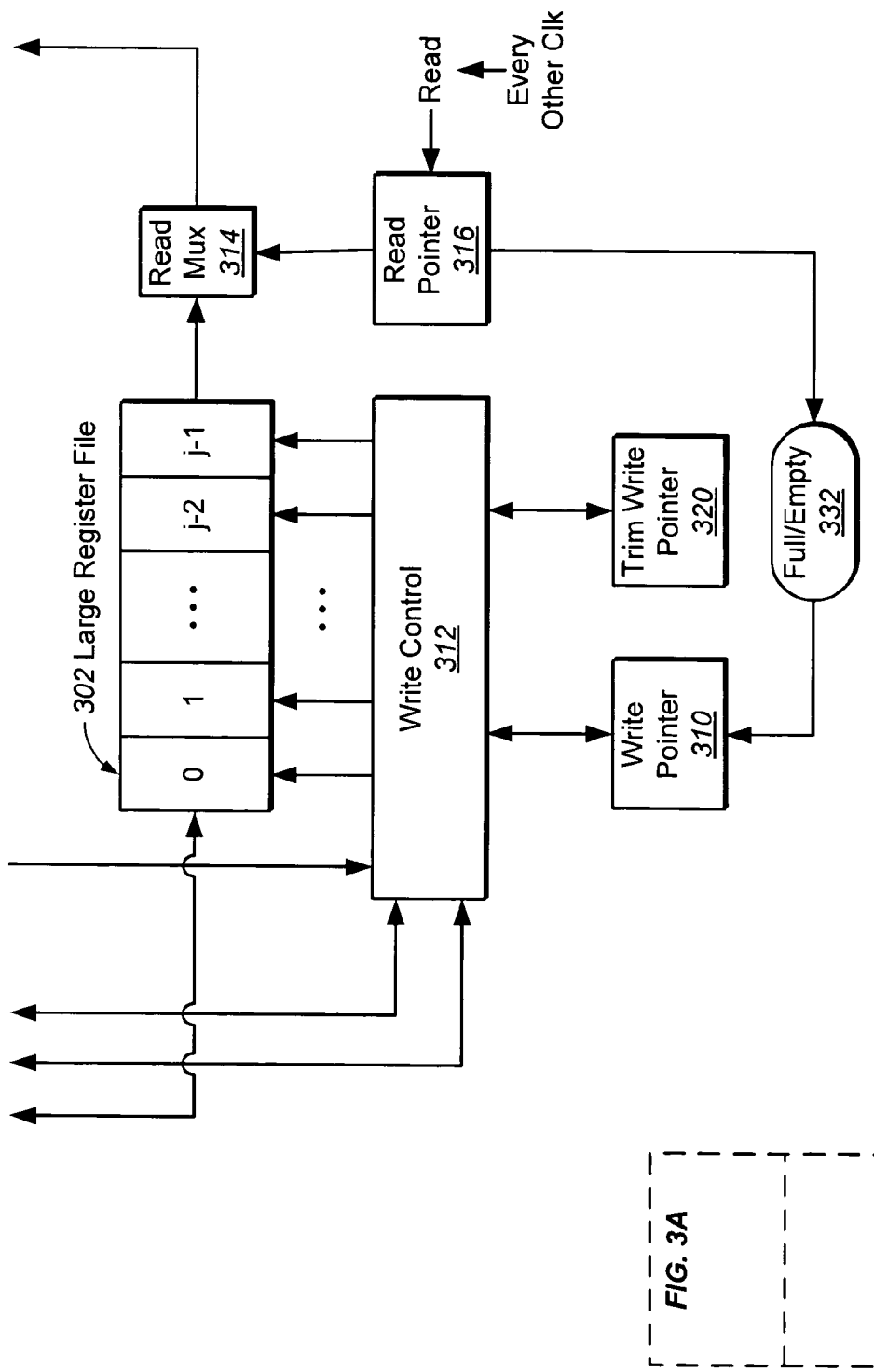

FIGS. 3A and 3B, together show a block diagram that illustrates a system for interleaving first and second halves of a data segment of unknown length according to an exemplary embodiment. More particularly, FIGS. 3A and 3B illustrate a system for interleaving first and second halves of a data segment in a data path pipeline that continuously takes S bits of the data segment in and S bits of the data segment out (wherein S=symbol size), and in which multiple input data segments are received concatenated together and multiple output interleaved data segments are transmitted concatenated together with no gaps in the pipeline. In addition, the actual length of the data segment is not known until an indication occurs indicating that a given input symbol is the last symbol of the input data segment. (A "symbol" is also referred to herein as a "unit of data".) The length of the data segment can, however, be bounded by a maximum value to assist in sizing structures used in the interleaving procedure. The interleaving system is generally designated by reference number 300 and may be implemented as interleaving system 240 in hard disk drive 226 in data processing system 200 illustrated in FIG. 2.

Interleaving system 300 generally includes two register files 302 and 304, also referred to as large register file 302 and small register file 304, various pointers, counters and other mechanisms for writing and reading register files 302 and 304, and interleaver 306. Interleaving system 300 interleaves first and second halves of an incoming data segment 308 by placing the first half of the incoming data segment into large register file 302, the second half of the incoming data segment into small register file 304, reading out the first and second data segment halves from register files 302 and 304 in parallel and then interleaving the first and second data segment halves using interleaver 306.

As indicated above, however, interleaving system 300 does not know the actual length of incoming data segment 308 until the last symbol of the data segment is received by the system. According to an exemplary embodiment, therefore, interleaving system 300 includes a mechanism for efficiently determining the dividing line between the first and second halves of incoming data segment 308 on the fly as the data segment is being processed by interleaving system 300.

Register file 302 is a relatively large register file and is provided to hold the first half of incoming data segment 308. Data symbols are written into incrementing symbol locations of register file 302 using incrementing and wrapping write pointer 310 via write control 312, and are read out of register file 302 using read mux 314 with an incrementing and wrapping read pointer 316, such as a simple FIFO (First In-First Out) structure. In order for register file 302 to recognize when enough data has been written in from the start of incoming data segment 308 to represent the entire first half of the data segment without any part of the second half of the data segment, all of the data from the data segment that can possibly be a part of the first half is written in, and then any extra data at the end is trimmed by backing write pointer 310 to the end of the actual first half using trim write pointer 320. The manner in which this is accomplished can best be understood by the following example with reference to FIG. 4, which is a diagram that schematically illustrates operation of large register file 302 of FIG. 3B. More particularly, in FIG. 4, large register file 302 includes five register locations designated as locations 1-5, and the figure schematically illustrates the state of large register file 302 at each of clock cycles clk0-clk7.

For the example, it is assumed that an incoming data segment has a maximum of 8 symbols wherein each symbol has two bits of data. For example, in FIG. 4, bits "a" and "b" together comprise a symbol, and each bit represents a half-symbol. Since the data segment has a maximum of 8 symbols in this example, the maximum size of half of the data segment is 4 symbols, and 4 symbols will be the maximum number of symbols that are needed to be sure to cover the first half of the data segment. It should be recognized that in an actual implementation, however, a data segment may have any number of symbols, and each symbol may have any number of bits (although each symbol of a particular data segment will have the same number of bits and, as will be explained hereinafter, the symbol preferably has an even number of bits), and it is not intended to limit the invention to a data segment of any particular length or form.

Figure 4:
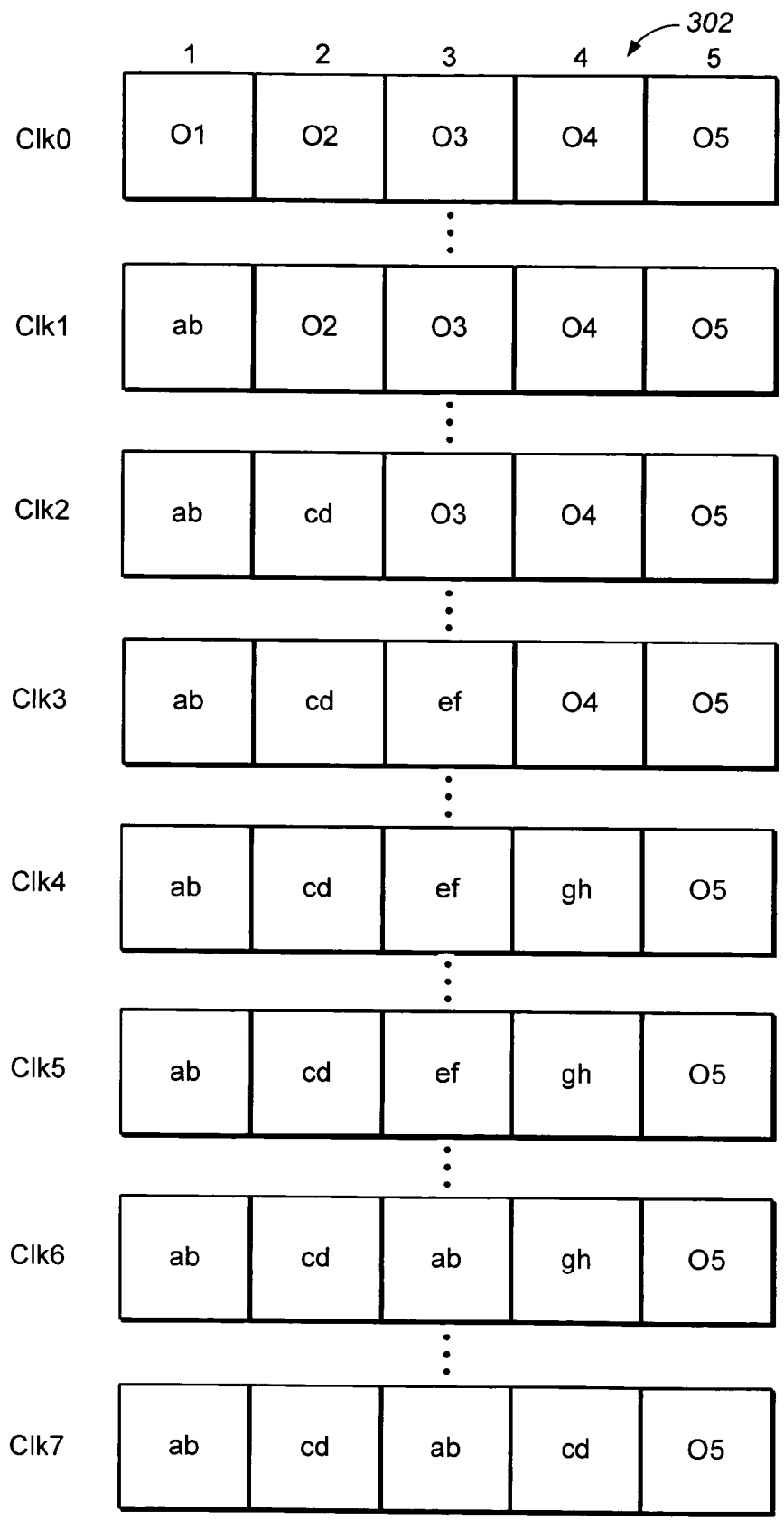
FIG. 4 is a diagram that schematically illustrates operation of the large register file of FIGS. 3A and 3B according to an exemplary embodiment.

As shown in FIG. 4, in clk0, large register file 302 contains only old data O1-O5 from the previous data segment that passed through the register file. In clk1, the first data symbol of an incoming data segment, composed of bits a and b, is written to location 1 specified by write pointer 310, and the write pointer then increments to location 2. Similarly, in clk2, clk3 and clk4, data symbols cd, ef and gh of the data segment are written into locations 2, 3 and 4, respectively, until bits a, b, c, d, e, f, g, h are all loaded into large register file 302 as shown in FIG. 4.

In clk5 it is determined that the actual length of the incoming data segment is 4 symbols. This can now be determined because the last symbol "gh" is marked to identify it as being the last symbol of the data segment. As a result, it is now also known that the actual length of the first half of the data segment is 2 symbols, i.e., symbols ab and cd. As a result, write pointer 310 is trimmed back by two symbols. In clks 6 and 7, bits a, b and c, d of the next data segment are brought into locations 3 and 4, respectively. The result is that symbols ab and cd, comprising the first half of data segment 308, are positioned together in large register file 302 ready for reading out.

The last symbol of the data segment can be marked in various ways to identify it as the last symbol. For example, as shown in FIG. 3A, marking can be achieved using a last symbol marker 350 in the form of a counter(s) that counts each symbol transferred and asserts a "last" signal 352 when the count reaches the number of symbols per segment. In addition, a counter that knows how much total data is available can assert the "last" signal when all available data has been transferred, even if the last available data does not arrive at the expected segment boundary. This is needed for data transfers that cannot be divided into an integer amount of segments of equal length. In this situation, the final data segment will be smaller than the previous equal segments, and the end of segment indication will not work for this final, smaller segment.

In the example illustrated in FIG. 4, because it was assumed that the incoming data segment had a maximum length of 8 symbols, large register file 302 is sized to store five symbols. (Even if it turns out that the data segment is longer than 5 symbols, for example, 6-8 symbols, there is no need to store more than the first four symbols of the data segment in large register file 302, since it is known that the first half can contain no more than 4 symbols.) In general, large register file 302 should be sized to store about (N/S)*(¾) symbols plus a margin of about 1-2 symbols. The margin will allow for the implementation to have some synchronous response to detecting the full condition. The margin can also be used for a synchronous clock of delay between the write and read sides starting the same data segment, assuming the rest of the pipeline control is built with the same assumption.

Returning to FIGS. 3A and B, register file 304 is a relatively small register file and is used to hold the second half of each incoming data segment 308. Small register file 304 basically operates to shift data symbols in during writes using shift control 322 and write control 312 and to read data symbols out using read mux 324 with incrementing/decrementing read pointer 326 that follows the shifting data. In general, small register file 304 operates in such a manner as to adjust data currently stored in the second register file during each clock cycle to comprise the last half of the data so far written into the second register file. In the example wherein a symbol is composed of two bits, as a symbol of input data segment 308 is shifted into small register file 304, the boundary between the first half and the second half of the data currently in the small register file is adjusted by half a symbol. Small register file 304 manages this boundary by first shifting in each new symbol into the structure, and then shifting half a symbol out of the structure. This is accomplished by defining a boundary between a new data segment and an old data segment as illustrated by the following example with reference to FIG. 5, which is a diagram that schematically illustrates operation of small register file 304 of FIG. 3A according to an exemplary embodiment. More particularly, FIG. 5 schematically illustrates the state of small register file 304 at each of clock cycles clk0-clk8.

Figure 5:
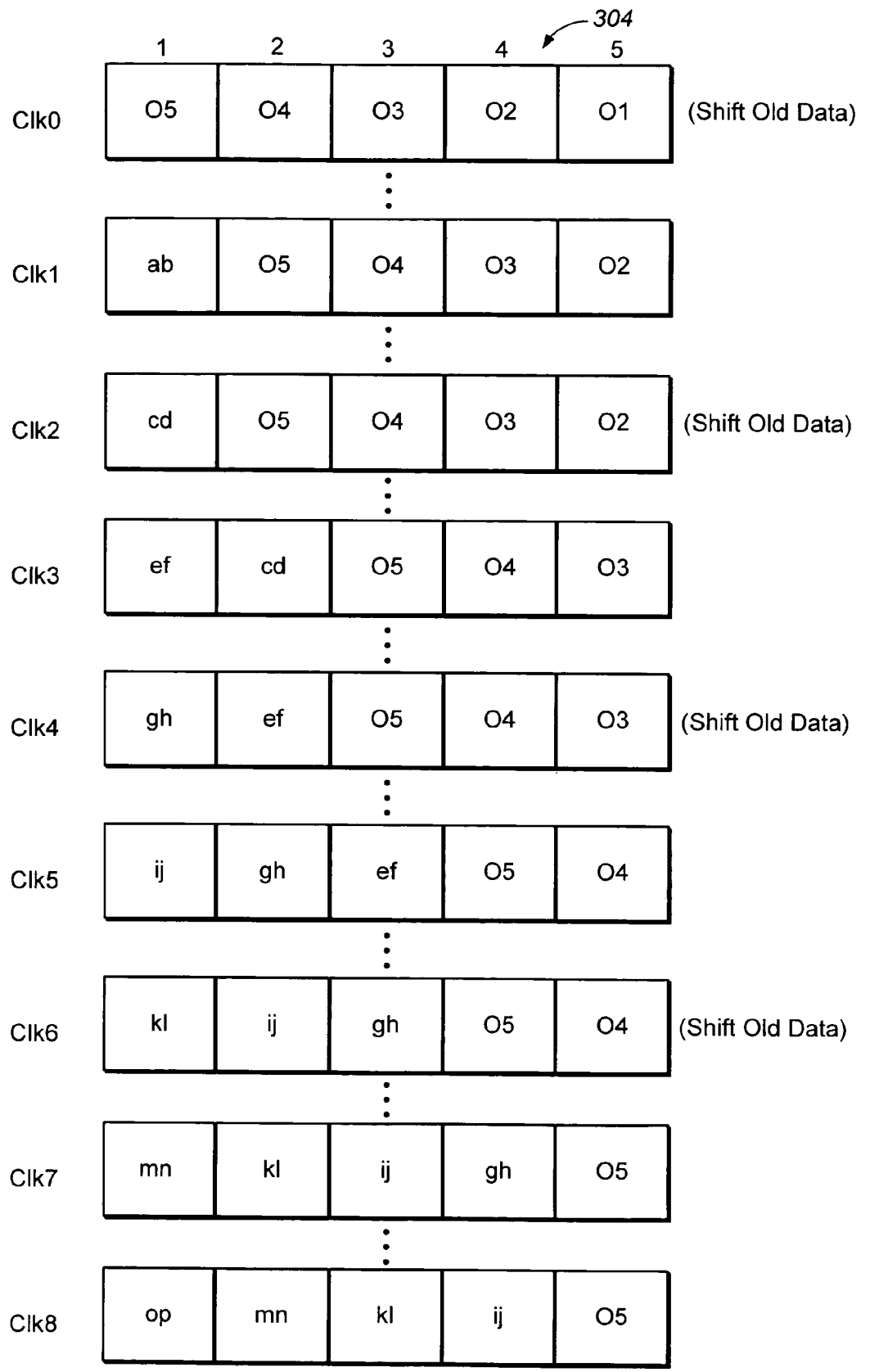
FIG. 5 is a diagram that schematically illustrates operation of the small register file of FIGS. 3A and 3B according to an exemplary embodiment.

For the example, it is assumed that small register file 304 has five locations designated as locations 1-5 in FIG. 5 for holding the second half of an eight symbol data segment, wherein each bit (such as bit "a" and bit "b") represents a half-symbol. Half-symbol granularity is needed because incoming data segment 308 may have an odd number of symbols and a data segment with an odd number of symbols will have a pointer between the first and second halves that is at a half-symbol boundary. It should be recognized that half-symbol granularity can be achieved by providing a symbol with any desired even number of bits.

As shown in FIG. 5, in clk0, small register file 304 only has a previously input, old data segment (O1-O5). No data symbols have been written for the new incoming data segment 308. In clk1, the first data symbol ab of incoming data segment 308 is shifted in, the previous data is shifted up, and half of a symbol ("a") is "shifted out". (The term "shifted out" as used in this exemplary embodiment does not mean that "a" has been physically removed from the register, but that it is to be considered as a pad bit and not real data. In this regard, the phrase "adjusting data currently stored in the second register file to comprise a last half of the data so far written into the second register file" as used herein includes considering bits as pad in the register file as well as physically removing data from the register file).

In clk2, the second data symbol cd of data segment 308 is shifted in, however, the old data is not shifted up. As shown, this action causes ab to be fully discarded and cd to be stored in the small register file (i.e., again, the data in the register file has been adjusted so that only the last half of the data so far written into the register file is currently stored). In clk3, symbol ef is shifted in and c is considered as pad. In clk4, gh is shifted in and ef is shifted up, but old data is not shifted so cd is discarded. Now efgh is the captured "second half" of the data segment in small register 304.

This pattern is repeated in clk5-clk8. Specifically, in clk5, segment ij is shifted in and ef, gh and the old data are shifted up. In clk6, kl is shifted in and ef is discarded, leaving kl, ij and gh in the register file. In clk7, mn is shifted in and the old data is shifted up. In clk8, op is shifted in and gh is discarded. At this point, the small register file contains ij, kl, mn and op which comprises precisely the second half of the original eight symbol data segment.

This pattern of shifting old data up every other clock and shifting the new data up to the edge of the old data every clock continues until clk8 where the final second half data of the data segment is captured and ready to be read out immediately following the old data segment's second half data.

As can be seen from FIG. 5, even if no data is being read from small register file 304, the next data to be read keeps shifting deeper into the register file. As a result, read pointer 326 needs to track this shifting data. When small register file 304 is empty, read pointer 326 begins by pointing to a virtual location that is before the first location of register file 304. This is done by allowing read pointer 326 to use 0 to represent the deepest location of the register file and using D, where D is the depth of the register file in symbols, to represent the first location where new data is shifted in. Thus, D+1 will represent the virtual location that is just before the first location of small register file 304.

If no reads are occurring, each time old data is shifted up, the read pointer will decrement to continue to point to the same old data. If a read of a symbol occurs and no write is occurring, the read pointer will increment to the next location in the small register file. If a shift of old data and a read of a symbol both occur together in the same clock cycle, then the read pointer will hold its state since the next read data has shifted into the location where the read pointer is already pointing.

In the exemplary embodiment illustrated in FIGS. 3A and 3B, read mux 324 is implemented as a symbol-size read mux structure. In each clock cycle, only half of the read symbol is needed to create the interleaved read data output, and the other half can be saved until the next cycle. A symbol-size read mux structure is useful because it also allows small register file 304 to be easily reused during a de-interleave operation, as will be explained below.

An advantage of this shifting structure is that, for writing, each symbol storage structure in small register file 304 only needs to either shift in the previous symbol or hold state. Holding state is a very efficient structure to implement using either clock gating cells or flops with hold paths built in. This results in a very efficient structure to physically place and route, since there is no requirement for the input write data to be written to each symbol storage structure of small register file 304. This structure also results in the second half symbols of each data segment residing next to each other in the register file, and they are thus easy to read out linearly with an incrementing read pointer 326.

According to an exemplary embodiment, small register file 304 is sized to be about (N/S)*(½) symbols plus a margin of about 1-2 symbols. The margin allows for the implementation to have some synchronous response to detecting a full condition. The margin could also be used to allow for a synchronous clock of delay between the write and read sides starting at the same data segment, assuming the rest of the pipeline control is built with this same assumption.

Continuing with reference to FIGS. 3A and 3B, number of written symbols counter 330 exists outside of large and small register files 302 and 304. Number of written symbols counter 330 counts each of the symbols written, independent of whether they are in the first or second half of the data segment. The last clock cycle of receiving the input segment is detected by an input "last" signal that identifies this as the last symbol of the input segment. As indicated previously, the last symbol may be marked by a counter(s) that counts the received symbols and "asserts" the "last" signal when the count equals the number of symbols in a data segment or the number of total available data symbols.

On the last clock cycle, number of written symbols counter 330 is used to determine the number of input segments received. Half of this count is the amount of symbols in the first half of the data segment, and half of the count is also the amount of symbols in the second half of the data segment. This size will be in units of S/2. If S/2 represents an odd number of half-symbols, then each of the register files has pad that the read side will need to discard. The pad is at the start of the second half segment in the small register file, and at the end of the first half segment in the large register file. The read side discards this pad by incrementing read pointer 316 to the next symbols after reading the first S/2-bits from this location. This count is passed to the read side on the last clock, for example, through a small FIFO structure, so the read side can know this count after it finishes reading the segment it is currently taking out of the two register files.

Number of written symbols counter 330 can also be used to know by how much to trim write pointer 310 of large register file 302. However, in accordance with an exemplary embodiment, trim write pointer 320 has been added to large register file 302 to make this trimming even simpler. Trim write pointer 320 increments only after every two input symbols, so it represents exactly the value to copy into the actual write pointer 310 on the last clock of receiving the input segment.

Full/Empty can also be calculated in large and small register files 302 and 304 as shown at 332 and 334 in FIGS. 3A and 3B, and can be used to throttle the input and output sides as is known in the art. Small register file 304 is empty any time read pointer 326 has incremented to the virtual entry before the start of the shifting structure. Full is detected in the small register file when read pointer 326 shifts to the deepest location (i.e., location 0) and the current write needs to perform a shift of old data. Optionally, the full condition can be optimized to not occur if a read is currently occurring, which is a conventional method in the art. Full/Empty 332 of large register file 302 is determined through simple compares of the write and read pointers, as is standard in the art. Other methods for detecting Full/Empty, such as detecting the condition one cycle earlier with some conservatism and then registering the result, can also be applied if desired.

The register structures are also convenient when reusing the same register file for de-interleaving, assuming a de-interleaver writes in half a symbol of de-interleaved data to each register file on each clock to assemble de-interleaved symbols that are ready to read out. For example, if the symbol size is 10 bits, then 10 bits of interleaved input data could be de-interleaved into two 5 bit half-symbols. The even bits would be written to the first half register file (small register file 304 in this case) and the odd bits would be written to the second half register file (large register file 302 in this case). When the data segment has been fully written into the two register files, small register file 304 will have all of the de-interleaved first half data ready to read out first, and after the first half data is read out, the second half data would be read from large register file 302.

For a de-interleave operation, the large and small register files 302 and 304 will have the same size requirements as in an interleave operation since small register file 304 is read first and can be backfilled sooner, and large register file 302 is read second and needs the larger space to retain half of the read segment and still receive the next segment's second half data until the current second half starts to be read out and backfilling can occur.

Both large register file 302 and small register file 304 can be modeled as S/2-bits write in and S-bits read out FIFOs using the same structures available from the interleave operation. On the write side of small register file 304, S bits can be accumulated in the first stage of small register file 304's shift structure and then shifted in as before. On the write side of large register file 302, the input S/2 bits could be routed to both the high and low halves of the input symbol to register file 302 and an even/odd pointer bit (not shown) could be added to extend write pointer 310 to indicate which S/2 bits to write in the register file selected by write pointer 310. Both read pointers 316 and 326 could be 10 bits as described for the interleave operation, which is precisely what is needed for the de-interleave operation.

An interleaving system according to the present invention thus permits the first and second halves of a data segment of unknown length to be interleaved on the fly. The system is physically quite small, such that it can be positioned at an optimum location for efficient routing and timing.

Figure 6:
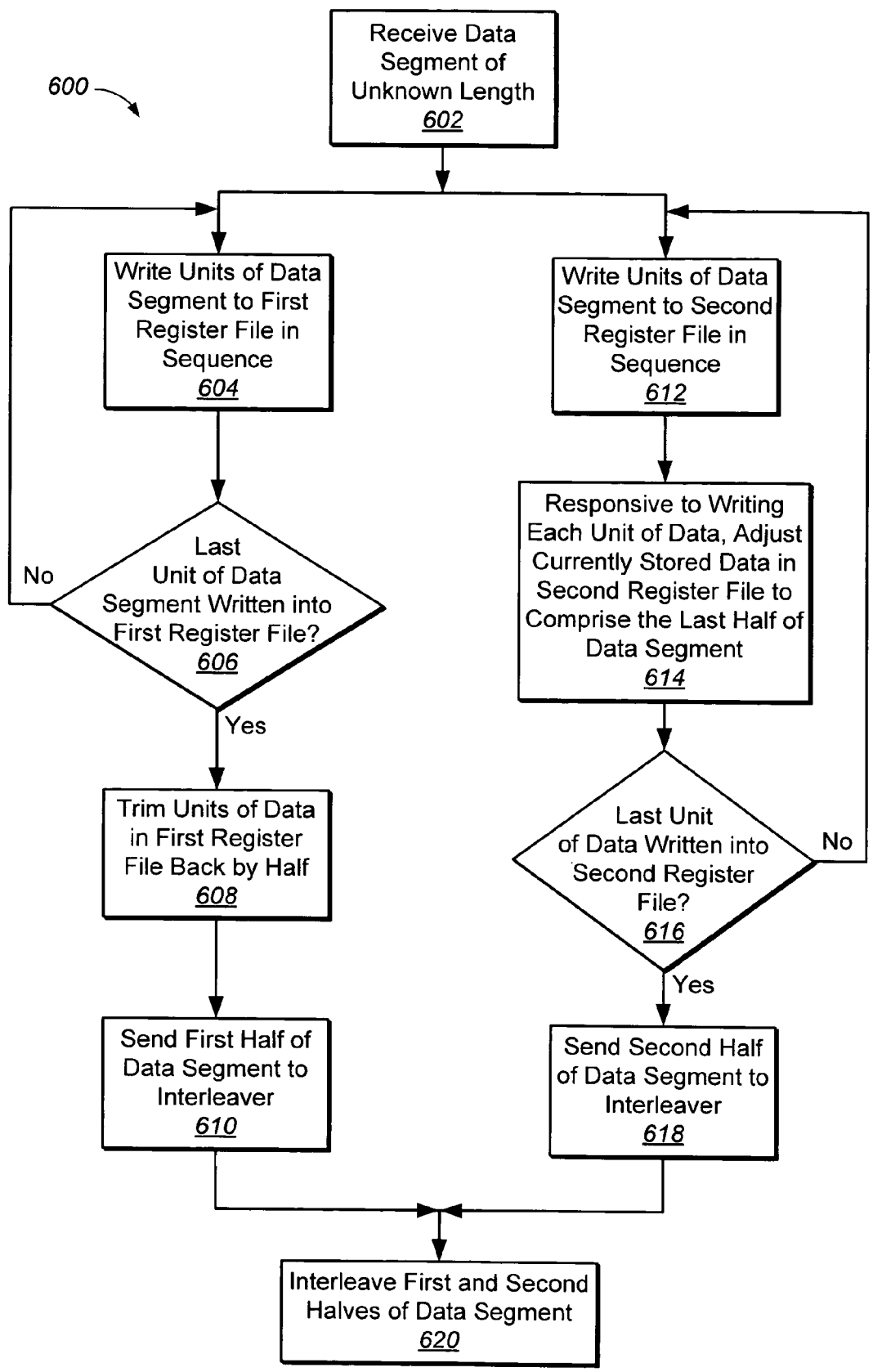
FIG. 6 is a flowchart that illustrates a method for interleaving first and second halves of a data segment of unknown length according to an exemplary embodiment.

FIG. 6 is a flowchart that illustrates a method for interleaving first and second halves of a data segment of unknown length according to an exemplary embodiment. The method is generally designated by reference number 600 and begins by receiving a data segment of unknown length (Step 602). Units of the data segment, e.g., symbols of the data segment, are sequentially written into first and second register files (Steps 604 and 612). This may be done simultaneously. With respect to the first register file, as each unit of the data segment is written into the first register file, a determination is made whether the unit is the last unit of the data segment (Step 606). If the unit is not the last unit of the data segment (No output of Step 606), the method returns to Step 604 to continue writing units of data. If the unit is the last unit of the data segment (Yes output of Step 606), the last half of the received units is trimmed back from the first register file resulting in the first half of the data segment being in the first register file (Step 608). The first half of the data segment is then sent to an interleavers (Step 610).

With respect to the second register file, responsive to writing each unit of data into the second register file, the data currently stored in the second register file is adjusted to comprise a last half of the data so far written into the second register file (Step 614). A determination is made whether the last unit of the data segment has been written into the second register file (Step 616). If the last unit of the data segment has not been written into the second register file (No output of Step 616), the method returns to Step 612. If the last unit of the data segment has been written into the second register file (Yes output of Step 616), the data currently stored in the second register file after being adjusted comprises the second half of the data segment. The second half of the data segment is then sent to the interleaver (Step 618).

The first half of the data segment from the first register file and the second half of the data segment from the second register file are sent to the interleaver in parallel where they are interleaved to provide an interleaved data segment (Step 620).

The description of the preferred embodiments of the present invention has been presented for purposes of illustration and description, but is not intended to be exhaustive or limited to the invention in the form disclosed. Many modifications and variations will be apparent to those of ordinary skill in the art. The embodiment described herein was chosen in order to best explain the principles of the invention and its practical application. This enables others of ordinary skill in the art to understand the invention for various embodiments with various modifications as are suited to the particular use contemplated.

What is claimed is:

1. A method for dividing a data segment into first and second halves of the data segment, wherein the data segment comprises an unknown plurality of data units, the method comprising:
    sequentially writing units of the data segment into first and second register files;
    with respect to the first register file:
        responsive to determining that the last unit of the data segment has been written into the first register file, removing units of the data segment in the first register file that are not units of the first half of the data segment, wherein the first register file stores the first half of the data segment;
    with respect to the second register file:
        responsive to writing each unit of the data segment into the second register file, adjusting data currently stored in the second register file to comprise a last half of the data so far written into the second register file, wherein when the last unit of the data segment has been written into the second register file, and the data currently stored in the second register file has been adjusted, the data currently stored in the second register file comprises the second half of the data segment; and
    wherein adjusting data currently stored in the second register file to comprise a last half of the data so far written into the second register file, includes:
        adjusting a boundary between a first half and a second half of the data currently stored in the second register file by half a unit of the data as a unit of the input data segment is written into the second register file.

2. The method according to claim 1, further comprising marking the last unit of the data segment to identify it as the last unit of the data segment, and wherein responsive to determining that the last unit of the data segment has been written into the first register file, removing units of data of the data segment in the first register file that are not units of the first half of the data segment, wherein the first register file stores the first half of the data segment comprises:
    responsive to detecting that the marked last unit of the data segment has been written into the first register file, removing units of the data segment in the first register file that are not units of the first half of the data segment, wherein the first register file stores the first half of the data segment.

3. The method according to claim 2, wherein removing units of the data segment in the first register file that are not units of data of the first half of the data segment, comprises:
    trimming the data stored in the first register file back to the first half of the data segment.

4. The method according to claim 3, wherein trimming the data stored in the first register file back to the first half of the data segment, comprises:
    counting units of data written into the first register file; and
    dividing the counted units of data written into the first register file by two.

5. The method according to claim 1, wherein a unit of data comprises an even number of data bits.

6. The method according to claim 1, wherein adjusting a boundary between a first half and a second half of the data currently stored in the second register file by half a unit of data as a unit of the input data segment is written into the second register file, comprises:
    one of removing the half a unit of data from the second register file or considering the half a unit of data as pad in the second register file.

7. The method according to claim 2, wherein marking the last unit of the data segment to identify it as the last unit of the data segment, comprises counting each unit of data written into the first and second register files.

8. The method according to claim 1, and further comprising:
    interleaving the first and second halves of the data segment to provide an interleaved data segment.

9. A system for dividing a data segment into first and second halves of the data segment, wherein the data segment comprises an unknown plurality of data units, the system comprising:
    first and second register files for receiving units of the data segment sequentially written thereinto,
    the first register file comprising:
    a removing mechanism, responsive to determining that the last unit of the data segment has been written into the first register file, for removing units of the data segment in the first register file that are not units of the first half of the data segment, wherein the first register file stores the first half of the data segment;
    the second register file comprising:
    an adjusting mechanism, responsive to writing each unit of the data segment into the second register file, for adjusting data currently stored in the second register file to comprise a last half of the data so far written into the second register file, wherein, when the last unit of the data segment has been written into the second register file, and the data currently stored in the second register file has been adjusted, the data currently stored in the second register file comprises the second half of the data segment; and
    wherein the adjusting mechanism includes:
    a boundary adjusting mechanism for adjusting a boundary between a first half and a second half of the data currently stored in the second register file by half a unit of the data as a unit of the input data segment is written into the second register file.

10. The system according to claim 9, and further comprising a last symbol marker for marking the last unit of the data segment to identify it as the last unit of the data segment, wherein the removing mechanism, responsive to detecting that the marked last unit of the data segment has been written into the first register file, removes units of the data segment in the first register file that are not units of the first half of the data segment, wherein the first register file stores the first half of the data segment.

11. The system according to claim 10, wherein the removing mechanism comprises:
    a trimming mechanism for trimming the data stored in the first register file back to the first half of the data segment.

12. The system according to claim 11, wherein the trimming mechanism comprises:
a counter for counting units of data written into the first register file; and
a mechanism for dividing the counted units of data written into the first register file by two.

13. The system according to claim 9, wherein a unit of data comprises an even number of data bits.

14. The system according to claim 9, wherein the boundary adjusting mechanism comprises:
a mechanism for one of removing the half a unit of data from the second register file or considering the half a unit of data as pad in the second register file.

15. The system according to claim 10, wherein the last symbol marker comprises a data unit counter for counting each unit of data written into the first and second register files.

16. The system according to claim 9, and further comprising:
an interleaver for interleaving the first and second halves of the data segment to provide an interleaved data segment.

17. A method for interleaving first and second halves of a data segment, wherein the data segment comprises an unknown plurality of data units, the method comprising:
sequentially writing units of the data segment into first and second register files;
with respect to the first register file:
responsive to determining that the last unit of the data segment has been written into the first register file, removing units of the data segment in the first register file that are not units of the first half of the data segment, wherein the first register file stores the first half of the data segment;
with respect to the second register file:
responsive to writing each unit of the data segment into the second register file, adjusting data currently stored in the second register file to comprise a last half of the data so far written into the second register file, wherein, when the last unit of the data segment has been written into the second register file, and the data currently stored in the second register file has been adjusted, the data currently stored in the second register file comprises the second half of the data segment;
interleaving the first and second halves of the data segment to provide an interleaved data segment; and
wherein adjusting data currently stored in the second register file to comprise a last half of the data so far written into the second register file, includes:
adjusting a boundary between a first half and a second half of the data currently stored in the second register file by half a unit of the data as a unit of the input data segment is written into the second register file.

18. The method according to claim 17, further comprising marking the last unit of the data segment to identify it as the last unit of the data segment.

19. A method for dividing a data segment into first and second halves of the data segment, wherein the data segment comprises an unknown plurality of data units, the method comprising:
sequentially writing units of the data segment into first and second register files;
with respect to the first register file:
responsive to determining that the last unit of the data segment has been written into the first register file, removing units of the data segment in the first register file that are not units of the first half of the data segment, wherein the first register file stores the first half of the data segment;
with respect to the second register file:
responsive to writing each unit of the data segment into the second register file, adjusting data currently stored in the second register file to comprise a last half of the data so far written into the second register file, wherein when the last unit of the data segment has been written into the second register file, and the data currently stored in the second register file has been adjusted, the data currently stored in the second register file comprises the second half of the data segment;
marking the last unit of the data segment to identify it as the last unit of the data segment, and wherein responsive to determining that the last unit of the data segment has been written into the first register file, removing units of data of the data segment in the first register file that are not units of the first half of the data segment, wherein the first register file stores the first half of the data segment includes: responsive to detecting that the marked last unit of the data segment has been written into the first register file, removing units of the data segment in the first register file that are not units of the first half of the data segment, wherein the first register file stores the first half of the data segment;
wherein removing units of the data segment in the first register file that are not units of data of the first half of the data segment includes trimming the data stored in the first register file back to the first half of the data segment; and
wherein trimming the data stored in the first register file back to the first half of the data segment, includes:
counting units of data written into the first register file; and
dividing the counted units of data written into the first register file by two.

20. A system for dividing a data segment into first and second halves of the data segment, wherein the data segment comprises an unknown plurality of data units, the system comprising:
first and second register files for receiving units of the data segment sequentially written thereinto,
the first register file comprising:
a removing mechanism, responsive to determining that the last unit of the data segment has been written into the first register file, for removing units of the data segment in the first register file that are not units of the first half of the data segment, wherein the first register file stores the first half of the data segment;
the second register file comprising:
an adjusting mechanism, responsive to writing each unit of the data segment into the second register file, for adjusting data currently stored in the second register file to comprise a last half of the data so far written into the second register file, wherein, when the last unit of the data segment has been written into the second register file, and the data currently stored in the second register file has been adjusted, the data currently stored in the second register file comprises the second half of the data segment;
a last symbol marker for marking the last unit of the data segment to identify it as the last unit of the data segment, wherein the removing mechanism, responsive to detecting that the marked last unit of the data segment has been written into the first register file, removes units of the data segment in the first register file that are not units of the first half of the data segment, wherein the first register file stores the first half of the data segment;

wherein the removing mechanism includes a trimming mechanism for trimming the data stored in the first register file back to the first half of the data segment; and wherein the trimming mechanism includes:

a counter for counting units of data written into the first register file; and a mechanism for dividing the counted units of data written into the first register file by two.

* * * * *